(12) United States Patent
Hanson et al.

(10) Patent No.: US 11,571,046 B2
(45) Date of Patent: Feb. 7, 2023

(54) CLAMPING SYSTEM

(71) Applicant: adidas AG, Herzogenaurach (DE)

(72) Inventors: Henry Hanson, Herzogenaurach (DE);
Maximilian Kurtz, Erlangen (DE);
Marco Grazietti, Grödig (AT); Fabian Willmes, Bad Dürrnberg (AT); Florian Huber, Grassau (DE); Matthias Rawa, Salzburg (AT)

(73) Assignee: adidas AG, Herzogenaurach (DE)

( * ) Notice: Subject to any disclaimer, the term of this patent is extended or adjusted under 35 U.S.C. 154(b) by 682 days.

(21) Appl. No.: 16/519,787

(22) Filed: Jul. 23, 2019

(65) Prior Publication Data
US 2020/0037710 A1 Feb. 6, 2020

(30) Foreign Application Priority Data
Aug. 6, 2018 (DE) .......................... 102018213115.5

(51) Int. Cl.
*B23B 31/163* (2006.01)
*A43D 86/00* (2006.01)
(Continued)

(52) U.S. Cl.
CPC ........ *A43D 86/00* (2013.01); *B23B 31/16004* (2013.01); *B23Q 3/00* (2013.01);
(Continued)

(58) Field of Classification Search
CPC ...... A43D 86/00; A43D 25/047; A43D 25/00; B23Q 3/00; B25B 1/2421; B25B 5/003;
(Continued)

(56) References Cited

U.S. PATENT DOCUMENTS

| 2,754,708 A | 7/1956 | Peterson |
| 4,691,398 A | 9/1987 | Kadogawa et al. |
| 5,556,085 A | 9/1996 | Cyr |

FOREIGN PATENT DOCUMENTS

| CH | 558694 | 2/1975 |
| CN | 205996836 | 3/2017 |

(Continued)

OTHER PUBLICATIONS

Chinese Application No. 201910716175.5, Notice of Decision to Grant dated Jun. 3, 2021, 3 pages (2 pages of English Translation and 1 page of Original Document).
(Continued)

*Primary Examiner* — Mahdi H Nejad
(74) *Attorney, Agent, or Firm* — Kilpatrick Townsend & Stockton LLP

(57) ABSTRACT

A clamping system for a component, especially for an article of footwear or a sports article, may include: (a) a first member; (b) a second member, (c) a pivot about which the first member and the second member are rotatable relative to each other; (d) a first bracket slidably movable along a first path on the first member and a second path, by a first distance, on the second member, when the first member and the second member are rotated relative to each other from a first angle to a second angle; and (e) at least a second bracket slidably movable along a third path on the first member and a fourth path, by a second distance, on the second member,
(Continued)

when the first member and the second member are rotated relative to each other from the first angle to the second angle.

19 Claims, 8 Drawing Sheets

(51) Int. Cl.
    *B25B 1/24*     (2006.01)
    *B23Q 3/00*     (2006.01)
    *B25B 5/00*     (2006.01)
    *B25B 11/02*     (2006.01)
    *B25B 5/08*     (2006.01)

(52) U.S. Cl.
    CPC ............ *B25B 1/2421* (2013.01); *B25B 5/003* (2013.01); *B25B 5/006* (2013.01); *B25B 5/08* (2013.01); *B25B 11/02* (2013.01)

(58) Field of Classification Search
    CPC ........... B25B 5/006; B25B 11/02; B25B 5/08; F16M 11/08; B23B 31/16004
    See application file for complete search history.

(56) References Cited

FOREIGN PATENT DOCUMENTS

| | | | |
|---|---|---|---|
| DE | 8026966 | | 3/1981 |
| DE | 202012004576 | * | 5/2012 |
| DE | 202012004576 | | 8/2012 |
| EP | 0533093 | | 3/1993 |

OTHER PUBLICATIONS

Chinese Application No. 201910716175.5, Office Action dated Dec. 1, 2020, 16 pages (English machine translation provided).

European Application No. 19189821.2, Extended European Search Report dated Jan. 7, 2020, 7 pages.

German Patent Application No. 102018213115.5, Office Action, dated May 21, 2019, 9 pages (English machine translation provided).

* cited by examiner

CLAMPING SYSTEM

CROSS REFERENCE TO RELATED APPLICATION

This application is related to and claims priority benefits from German Patent Application No. DE 102018213115.5, filed on Aug. 6, 2018, entitled "CLAMPING SYSTEM" ("the '115 application"). The '115 application is hereby incorporated herein in its entirety by this reference.

FIELD OF THE INVENTION

The present invention relates generally to clamping systems, and more particularly, although not necessarily exclusively, to clamping systems for the production of an article of footwear or a sports article.

BACKGROUND

Numerous clamping systems are known for temporarily fixing workpieces during assembly. It is frequently required in a production environment to secure workpieces of different sizes for a particular process. In order to allow an accurate and secure arrangement of a workpiece, it is presently required to use a number of custom-fitted forms or molds. This is especially true for fragile and/or soft workpieces, which cannot be clamped with great force without risking damage to the workpiece.

For example, an issue in the production of footwear concerns the securing of a midsole during assembly. Present methods involve a number of forms that are fitted specifically for one particular type, size, and side (left/right) of midsole. This leads to a large inventory and lost processing time due to tooling change over.

It may be desirable therefore to provide an improved clamping system and method that allows even fragile workpieces of different sizes, shapes, and types to be secured during processing in a simple and effective manner.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a clamping system may be provided for an article of footwear or a sports article. The clamping system may include: a first member, a second member, and a pivot about which the first member and the second member are rotatable relative to each other. The clamping system may also include a first bracket slidably movable at least partly along a first path on the first member and at least partly along a second path, by a first distance, on the second member when the first member and the second member are rotated relative to each other from a first angle to a second angle. The clamping system may also include at least a second bracket slidably movable at least partly along a third path on the first member and at least partly along a fourth path, by a second distance, on the second member, when the first member and the second member are rotated relative to each other from the first angle to the second angle.

In some embodiments, the first member includes a first plate, the second member includes a second plate, the first path is defined by a first slot arranged in the first member, the third path is defined by a second slot arranged in the first member, the second path is defined by a first channel arranged in the second member, and the fourth path is defined by a second channel arranged in the second member.

In some embodiments, the clamping system features at least one of: the first bracket is attached to a first pin arranged in the first slot; the second bracket is attached to a second pin arranged in the second slot; the first bracket is attached to a first slider arranged in the first channel; or the second bracket is attached to a second slider arranged in the second channel.

In some embodiments, the clamping system features at least one of: the first pin is attached to the first member such that the first pin is slidable along the first slot, but cannot move out of the first slot; the second pin is attached to the first member such that the second pin is slidable along the second slot, but cannot move out of the second slot; the first slider is attached to the second member such that the first slider is slidable along the first channel but cannot move out of the first channel; or the second slider is attached to the second member such that the second slider is slidable along the second channel but cannot move out of the second channel.

In some embodiments, the clamping system features at least one of: the first bracket is further attached to a third slider arranged in a third channel arranged in the second member; or the second bracket is further attached to a fourth slider arranged in a fourth channel arranged in the second member.

In some embodiments, rotation of the first member relative to the second member from the first angle to the second angle causes at least one of the first bracket or the second bracket to move towards the article of footwear or the sports article.

In some embodiments, the second distance is greater than the first distance.

In some embodiments, rotation of the first member relative to the second member from the first angle to the second angle causes the first bracket to move towards the second bracket.

In some embodiments, the second path and the fourth path are essentially linear.

In some embodiments, the first path includes a first position and a second position, where the first position is located at a first-position distance from the pivot and the second position is located at a second-position distance from the pivot, and where the first-position distance is different from the second-position distance. Additionally or alternatively, in some embodiments, the third path includes a third position and a fourth position, where the third position is located at a third-position distance from the pivot and the fourth position is located at a fourth-position distance from the pivot, and where the third-position distance is different from the fourth-position distance.

In some embodiments, the clamping system features at least one of: the first path includes a first essentially circular segment; or the third path includes a second essentially circular segment.

In some embodiments, the first segment and the second segment are not concentric.

In some embodiments, the first segment has a first center, the second segment has a second center, the first center is displaced by a first displacement vector from the pivot, and the second center is displaced by a second displacement vector from the pivot that is not identical to the first displacement vector.

In some embodiments, the second displacement vector has a larger magnitude than the first displacement vector.

In some embodiments, the clamping system includes at least three brackets, and the three brackets are arranged so as to form a convex void for receiving a convex component in at least one angular orientation of the first and second member.

In some embodiments, the article of footwear or the sports article is a sole element of an article of footwear, the second bracket is configured to contact a forefoot portion of the sole element, and the first bracket is configured to contact a rearfoot portion of the sole element.

According to certain embodiments of the present invention, provided may be a method of securing a component of an article of footwear or of a sports article. The method may include rotating a first plate to a first angle relative to a second plate of a system that includes the first plate, the second plate, a first bracket slidably movable at least partly along a first path on the first plate and at least partly along a second path on the second plate in response to the rotating, and a second bracket slidably movable at least partly along a third path on the first plate and at least partly along a fourth path on the second plate in response to the rotating. The method may further include arranging the component proximate to the first bracket and the second bracket. The method may further include rotating the first plate to a second angle relative to the second plate such that at least one of the first bracket or the second bracket touches the component.

In some embodiments, the component is a sole element or a midsole element.

In some embodiments the component is a sole element, and the method further includes attaching a portion of an upper to the sole element, when the sole element is secured in the clamping system.

According to certain embodiments of the present invention, a clamping system may be provided for a component of an article of footwear or a sports article. The clamping system may include a first plate having a first slot and a second slot; a second plate having a first channel and a second channel, a first pin received in the first slot of the first plate; a second pin received in the second slot of the first plate; a first slider received in the first channel of the second plate; a second slider received in the second channel of the second plate; a pivot about which the first plate and the second plate are rotatable relative to each other; a first bracket coupled with the first pin and the first slider so as to be slidably movable at least partly along the first slot of the first plate and at least partly along the first channel, by a first distance, of the second plate when the first member and the second member are rotated relative to each other from a first angle to a second angle; and at least a second bracket coupled with the second pin and the second slider so as to be slidably movable at least partly along the second slot of the first plate and at least partly along the second channel, by a second distance, of the second plate, when the first member and the second member are rotated relative to each other from the first angle to the second angle.

BRIEF DESCRIPTION OF THE DRAWINGS

In the following detailed description, embodiments of the invention are described referring to the following figures.

BRIEF DESCRIPTION

Figure 1A:
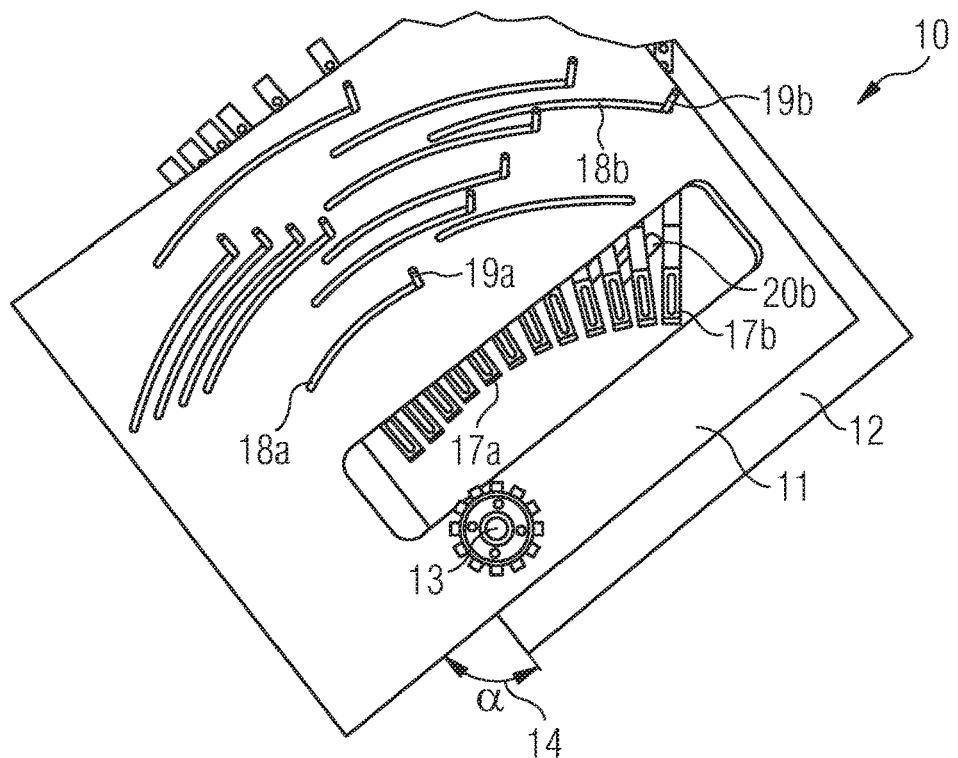
FIGS. 1A-C show an example of a clamping system in operation according to various embodiments.

A clamping system may be provided for a component, especially for an article of footwear or a sports article, and include a first member; and a second member, wherein the first member and the second member are rotatable relative to each other about a pivot. The clamping system may further include; a first bracket, wherein the first bracket is adapted to slidably move along a first path on the first member and a second path, by a first distance, on the second member, when the first member and the second member are rotated relative to each other from a first angle to a second angle. The clamping system may further include at least a second bracket, wherein the second bracket is adapted to slidably move along a third path on the first member and a fourth path, by a second distance, on the second member, when the first member and the second member are rotated relative to each other from the first angle to the second angle.

An article of footwear may be a shoe, a boot, a hiking boot, a running shoe, a football boot, a tennis shoe, a golf shoe, sandal, etc. A sports article may be any type of apparel especially used for sports, or any sports accessory, such as for example, a tennis racket, a baseball bat, a shinguard, a glove, a knee or elbow protector, etc.

A path may be understood as a physical path, rather than a potentially mathematically infinite path, a section of which would be the physical path.

A member may be understood as any solid construction, that may consist of just a single piece or may comprise several pieces, which are connected in some embodiments. The member may be essentially rigid, wherein "essentially rigid" means not necessarily rigid in a strictly mathematical sense but allowing for some flexibility inherent to real materials, such as a metal, e.g., aluminium, steel etc., wood, polymers, e.g., acrylonitrile butadiene styrene copolymer (also known as ABS), poly(methyl methacrylate), a polycarbonate etc. The surfaces of each of the members may or may not be flat.

A bracket may be understood to be any moveable item configured for securing the component by contacting and engaging the component. It is to be understood that the clamping system may comprise further brackets, for example a third bracket, a fourth bracket, a fifth bracket etc. The clamping system may allow the relative motion of the first bracket and the second bracket to be controlled with a single operation, e.g., the relative rotation of the first member and the second member. Therefore, the system may be easy and fast to operate and may be adapted to different sizes of components simply by rotating the first member relative to the second member. It is to be understood that it may not be important which member is physically rotated with respect to an external reference frame, such as a workbench. It may be only important that a relative rotation of the first member and the second member is performed. Thus the first distance and the second distance by which the first and bracket move, respectively, may be determined by the first and second angle. In other words, a single parameter, the relative angle of the first and second member, may control the motion of the first bracket, the second bracket, and further brackets, if present.

The first angle and the second angle may be defined with respect to one, e.g., the same, suitable axis. There may be numerous suitable axes, for example the first angle and the second angle may conveniently be measured with respect to an edge of the first member or the second member. It is to be understood that the first angle and the second angle are not necessarily limiting angles, e.g., a minimum or a maximum physically reachable value. In other words, the clamping system may be operable beyond the first and the second angle.

The rotation axis about which the first member and the second member rotate may be essentially perpendicular to the first member and/or the second member. However, it is also possible that the rotation axis is tilted by a tilting angle with respect to a normal to the surface of the first member and/or a normal to the surface of the second member. This way, the clamping system may allow the relative motion of the first bracket and the second bracket to be controlled in three dimensions (relative to the first and/or second member and so also relative to the component). The tilting angle may be at least 5°, or at least 15° to allow a greater control in three dimensions.

The pivot may be located on the rotation axis. However, it is not necessary for a physical joint to be located at the pivot. The rotation mechanism may be located away from the pivot. For example, this may be done by an essentially-circular guiding wheel arranged at an outside of the clamping system, wherein a rotation center of the guiding wheel is located at the pivot. The guiding wheel may be supported from below with a circular bearing. The mechanism driving the motion may be on an outside of the clamping system, for example as a linear actuator acting tangentially to the ring, or with a geared interface, and/or a motor. This may provide more space for a component to be secured by the clamping system.

Any one of the first path, the second path, the third path, and the fourth path may have any shape, for example approximated by or given by any mathematical function, which may, for example, be defined by an explicit equation or a parametric equation. For example, suitable functions may define a circle, an ellipse, a hyperbola, a trochoid, a cycloid, a parabola, a straight line, a sinusoid, or combinations thereof. The shapes of the paths may determine the motion of the first bracket and the second bracket effected by the relative rotation of the first member at the second member. Therefore, the shapes may be selected such that different sizes of components are clamped effectively when engaged by the first bracket and the second bracket. Therefore, the clamping system in some embodiments allows a component to be secured effectively even without application of a large clamping force, thus preventing damage especially to a soft or fragile component.

Any one of the first path, the second path, the third path, and the fourth path may be located on a surface of the first member or the second member, respectively.

In some embodiments, any one of the first path, the second path, the third path, and the fourth path may be located on an inside of the first member and/or the second member. This arrangement may also allow a three-dimensional control of the first bracket and the second bracket by a single operation, e.g., the relative rotation of the first member and the second member.

The first member may comprise a first plate and the second member may comprise a second plate. In some embodiments, this allows for a simple production of the first member and the second member and enables a great amount of choice for any one of the first path, the second path, the third path, and the fourth path, without the risk of collision between any of the paths, which is preferably avoided.

The first path may be defined by a first slot arranged in the first member and the third path may be defined by a second slot arranged in the first member. A slot may be any indentation or recess that may or may not extend from a surface to an opposing surface on the first member. This may allow a simple, accurate, and fast production of the first member and provide a durable first and third path. For example, a slot may be drilled or milled into the first member. However, other arrangements are possible. For example, the first path may be defined by a first guide rail or a first pair of guide rails and the third path may be defined by a second guide rail or a second pair of guide rails.

In some embodiments, the first bracket may be attached to a first pin and/or the second bracket may be attached to a second pin, wherein the first and/or the second pin is/are arranged in the first slot or the second slot, respectively. A pin may have approximate rotational symmetry such as to facilitate low-friction sliding along the first and second slot. In particular, the first bracket may be essentially rigidly attached to a first pin and/or the second bracket may be essentially rigidly attached to a second pin. "Essentially rigidly attached" means not allowing for any relative motion except due to some flexibility of the material and manufacturing tolerances. This setup using a pin may be produced simply and accurately and allows for an accurate control of the first bracket and the second bracket with low wear and tear.

The first pin and/or the second pin may further comprise components for attaching the first pin and/or the second pin to the first member such that the first pin and/or the second pin may slide along the first slot or the second slot, respectively, but cannot move out of the first slot or the second slot, respectively. For example, suitable components for attaching for this purpose may be a nut tightened around a threaded pin. This way, the clamping system is more robust and may be used with a reduced need for maintenance in an industrial production environment.

The second path may be defined by a first channel arranged in the second member and the fourth path may be defined by a second channel arranged in the second member. A channel may be any indentation or recess that may or may not extend from a surface to an opposing surface of the second member. This may allow a simple, accurate, and fast production of the second member and provide a durable second and fourth path. For example, a channel may be drilled or milled into the second member. However, other arrangements are possible. For example, the second path may be defined by a third guide rail or a third pair of guide rails and the fourth path may be defined by a fourth guide rail or a fourth pair of guide rails.

The first bracket may be attached to a first slider and/or the second bracket may be attached to a second slider, and the first and/or the second slider may be arranged in the first channel or the second channel, respectively. Each bracket may be attached to one slider to allow a spatially-efficient arrangement.

The first bracket may further be attached to a third slider and/or the second bracket may further be attached to a fourth slider. The third and/or the fourth slider may be arranged in a third channel or a fourth channel, respectively. In other words, the first bracket and/or the second bracket may be attached to two sliders. In some embodiments, this allows a more stable locking-mechanism of the first and/or second bracket and may prevent twisting and uneven bending forces.

The third channel may be essentially parallel to the first channel, and the fourth channel may be essentially parallel to the second channel. In general, the first bracket and/or the second bracket may be attached to further sliders.

The first bracket may be essentially rigidly attached to a first slider (or possible further sliders such as the third slider), and/or the second bracket may be essentially rigidly attached to a second slider (or possible further sliders such as the fourth slider). This setup using a slider may be produced simply and accurately and may allow for an accurate control of the first bracket and the second bracket with low wear and tear. A slider may be a protrusion similar to a pin. A slider may lack rotational symmetry such as to prevent rotation of the first bracket and/or the second bracket with respect to the second member. However, it is also possible that a non-rotationally-symmetric slider may be attached to the first bracket or the second bracket, respectively, using a rotatable attachment mechanism. In some embodiments, this may improve the stability of the clamping system.

The first slider and/or the second slider (or any further sliders) may further comprise components for attaching the first slider and/or the second slider to the second member such that the first slider and/or the second slider may slide along the first channel or the second channel, respectively, but cannot move out of the first channel or the second channel, respectively. For example, suitable components for attaching for this purpose may be a nut tightened around a threaded slider, or groves formed on the sides of the slider. This way, the clamping system may be more robust and may be used with a reduced need for maintenance in an industrial production environment.

Any of the pins, sliders, slots, or channels may comprise a durable, low friction material, e.g., polytetrafluoroethylene (PTFE), which may be applied as a surface coating or in the bulk of any of these parts.

The first bracket and/or the second bracket may be rotatable with respect to the first member and/or the second member. In particular, the first bracket and/or the second bracket may be rotatable with respect to the second member. This additional degree of freedom may allow a better grip of the first bracket and/or the second bracket of the component. However, it is also possible that the first bracket and/or the second bracket are not rotatable with respect to the second member. This arrangement may be simpler and may be more stable.

Rotation of the first member relative to the second member from the first angle to the second angle may cause the first bracket and/or the second bracket to move towards the component. Therefore, the clamping system may engage the component when rotating the first member relative to the second member from the first angle to the second angle. It should be noted that the clamping system, in particular the first bracket and the second bracket, may already engage the component before the full range of motion of the clamping system has been exploited, e.g., before the second angle has been reached, when starting from the first angle.

The second distance may be greater than the first distance. In other words, the first bracket and the second bracket may move in a non-symmetric, non-circular manner, when rotating the first member relative to the second member. In some embodiments, many components have an irregular shape. Therefore, the differences between different sizes of a component may be greater in some areas than in other areas. This arrangement therefore may improve the accuracy of the grip for different sizes of components.

It is important to understand, that a different movement of the first bracket and the second bracket, e.g., a second distance that is greater than the first distance, may be achieved for numerous shapes of the first and third path.

Rotation of the first member relative to the second member from the first angle to the second angle may cause the first bracket to move towards the second bracket. For example, the first bracket and the second bracket may be located on opposite sides of the component. Therefore, this arrangement may allow a particularly good grip on the component.

The second path and the fourth path may be essentially linear. This arrangement may allow for a simple construction as well as a low wear and tear, e.g., on the first and second slider (or any further sliders).

The first path may comprise a first position and a second position, wherein the first position may be located at a first-position distance from the pivot and the second position may be located at a second-position distance from the pivot, wherein first-position distance may be different from the second-position distance; and/or the third path may comprise a third position and a fourth position, wherein the third position may be located at a third-position distance from the pivot and the fourth position may be located at a fourth-position distance from the pivot, wherein the third-position distance may be different from the fourth-position distance.

By rotating the first member relative to the second member such that the first bracket slidably moves along the first path from the first position to the second position, the first bracket moves relative to the second member. The first position may correspond to the first angle and the second position may correspond to the second angle. If the first-position distance is different from the second-position distance, a first bracket displacement vector, defining the direction and magnitude of displacement of the first bracket, comprises a radial component with respect to the pivot. In some embodiments, this is especially effective in achieving a good clamping effect, since it means that the component is pushed towards or away from the pivot by the first bracket. Similarly, by rotating the first member relative to the second member such that the second bracket slidably moves along the third path from the third position to the fourth position, the second bracket moves relative to the second member. The third position may correspond to the first angle and the fourth position may correspond to the second angle. If the third-position distance is different from the fourth-position distance, a second bracket displacement vector, defining the direction and magnitude of displacement of the second bracket, comprises a radial component with respect to the pivot. In some embodiments, this is especially effective in achieving a good clamping effect, since it means that the component is pushed towards or away from the pivot by the second bracket.

Clamping may be particularly effective if the first-position distance is different from the second-position distance and the third-position distance is different from the fourth-position distance. In this case, the first bracket pushes the component radially towards or away from the pivot and the second bracket pushes the component radially towards or away from the pivot. Thus, the first bracket and the second bracket may, in some configurations, clamp the component between them, without the need for further structural elements to guide or hold the component.

The displacement of the first bracket upon rotation of the first member relative to the second member from the first angle to the second angle may be determined and engineered as follows. The rotation of the first member relative to the second member may cause a circular motion of the first member relative to the second member in the plane of rotation. A first position of the first bracket may be defined. Physically, the first position may, for example, be defined by a first position of a first pin. A circle centered on the pivot may be drawn through the first position, thus also defining a starting position on the circle, which may be selected to coincide with the first position. A final position on the circle, in the reference frame of the first member, may be determined by the starting position, the first angle, and the second angle, wherein the first and second angle are defined by the relative orientation of the first member and the second member. A desired first bracket displacement vector may be defined. The first bracket displacement vector may be arranged radially pointing away or towards the pivot. However, it is also possible that the first bracket displacement vector further comprises a non-radial component. The vector sum of the final position on the circle and the first bracket displacement vector may determine the second position on the first path. Since the first and second angle may be defined with respect to the relative orientation of the first member and the second member, the angle between the first position of the first bracket and the second position of the first bracket, both determined with respect to the pivot, may be not identical to the difference between the first and second angle, if the first bracket displacement vector further comprises a non-radial component.

The first bracket may be constrained to slidably move at least partly along the second path. Therefore, in the simple case in which the second path is linear, the first bracket displacement vector is parallel to a second path vector, which is defined by the direction of the second path, in the reference frame of the second member. It is to be understood, that a similar method may be applied to determine the displacement of the second bracket or any additional brackets, if present, upon rotation of the first member relative to the second member from the first angle to the second angle.

The first path may comprise a first essentially circular segment and/or the third path may comprise a second essentially circular segment. "Essentially circular" means, in this context, that the first segment and/or the second segment need not be mathematically perfect segments, but may allow for manufacturing tolerances. This arrangement may allow for a simple construction and a smooth movement of the first and second bracket, therefore helping to prevent damage to the component due to a sudden movement of the first and second bracket. Moreover, it may help to ensure that the first and second bracket move at the same speed when the first member and the second member are rotated relative to each other about the pivot thus allowing an effective clamping without an undesirable movement of the component, that may be caused by clamps that move at different speeds.

The first path may comprise a first end and a second end, wherein the first path may deviate from an essentially circular shape at the first end by a first deviation vector and/or at the second end by a second deviation vector. Additionally or alternatively, the third path may comprise a third end and a fourth end, wherein the third path may deviate from an essentially circular shape at the third end by a third deviation vector and/or at the fourth end by a fourth deviation vector.

The center of the first essentially circular segment may be located at the pivot. Therefore, the sum of the first and the second deviation vector may yield the first distance. Additionally, or alternatively, the center of the second essentially circular segment may be located at the pivot. Therefore, the sum of the third and the fourth deviation vector may yield the second distance.

This arrangement may allow for a simple arrangement of the clamping system.

The first segment and the second segment may be not concentric. In the case that the first and second segment are essentially circular, the arrangement wherein the first segment and the second segment are not concentric allows a simple way of effecting a different motion of the first bracket compared to the second bracket, e.g., in order to improve the accuracy of the grip for different sizes of components as described herein.

The first segment may have a first center, and the second segment may have a second center. The first center may be displaced by a first displacement vector from the pivot, and the second center may be displaced by a second displacement vector from the pivot that is not identical to the first displacement vector. This arrangement may allow improved control of the motion of the first bracket and the second bracket in order to improve the accuracy of the grip for different sizes of components as described herein.

The second displacement vector may have a larger magnitude than the first displacement vector. In some embodiments, the greater the displacement vector, the greater the motion of the respective bracket may be, that is effected by a rotation of the first member relative to the second member by a given rotation angle. Therefore, this arrangement may effect a larger movement of the second bracket compared to the first bracket, thus improving the accuracy of the grip for different sizes of components as described herein. The first, second, third, and fourth path may be selected such as to engineer a different timing and/or speed of the first and second bracket.

The clamping system may comprise at least three brackets and the three brackets may be arranged such as to form a convex void for receiving a convex component in at least one angular orientation of the first and second member. It is also possible that the void comprises a concave shape or a mixed concave and convex shape, e.g., a first part of the void may be convex while a second part of the void may be concave. Many components may have a convex shape for at least a portion of the component, for example much of a forefoot region of an article of footwear has a convex shape.

Therefore, the grip may be improved for components that comprise a convex shape. However, the three brackets may alternatively be arranged to create a concave void for receiving a concave component in at least one angular orientation of the first and second member.

The component may be a sole element of an article of footwear. Sole elements may be fragile and/or soft and thus the clamping system in some embodiments is particularly beneficial for securing a sole element for an article of footwear, e.g., during production or repair.

The second bracket may be configured to contact a forefoot portion of the sole element, and the first bracket may be configured to contact a rearfoot portion of the sole element. This arrangement may be beneficial to achieve a minimum level of grip. Moreover, the differences between different sizes of an article of footwear may be greater in a forefoot portion than in a rear foot portion. Therefore, the combination of this feature and the feature wherein the second distance may be greater than the first distance, may be particularly beneficial as rotation of the first member and the second member by a given angle therefore may lead to a greater attraction or advancement of the second bracket in a forefoot portion than of the first bracket in the rear foot portion.

At least one of the first bracket, the second bracket, the first element, or the second element, may comprise a metal, e.g., aluminium, steel, etc. A metal may generally offer a good level of durability. Alternatively or additionally the first bracket, the second bracket, the first element, and/or the second element, may comprise wood, polymers, e.g., acrylonitrile butadiene styrene copolymer (also known as ABS), poly(methyl methacrylate), a polycarbonate etc, which are also durable but more lightweight.

Some embodiments further concern a method of securing a component, especially for an article of footwear or a sports article. The method may include using a clamping system described herein. The benefits of a clamping system may therefore lead to an improved method of securing a component in various embodiments.

The using may comprise: (a) rotating the first plate to the first angle relative to the second plate; (b) arranging the component proximate to the first and the second bracket; and (c) rotating the first plate to the second angle relative to the second plate such that the first and/or second brackets touches the component.

In other words, the first angle and the second angle may represent the opening and closing position of the clamping system for a particular application based, for example, on the properties of the component, especially its size and shape, and the procedure to be performed. It should be understood that any or all steps or acts of this method may be performed automatically, for example by a computer-controlled system.

The component may be a sole element. It was already described herein, why the clamping system in some embodiments may be particularly beneficial for securing a sole element.

The sole element may comprise a midsole. A midsole is generally quite soft, especially compared with an outsole. Therefore, the method in various embodiments is particularly beneficial and may help to prevent damage to a soft and fragile midsole. The sole element may further comprise an outsole.

The method may further comprise attaching a portion of an upper to the midsole, when the sole element is secured in the clamping system. This is an important step in the production of footwear. It is important that the sole element is secured well during this production step, since once the portion of the sole element is secured to the upper, it may be not possible to adjust their arrangement without damaging the article of footwear.

The attaching may comprise welding. Welding, for example infrared welding, may be desirable since it does not involve the use of solvents. Furthermore, a particularly secure connection may be achieved if two similar materials, for example two materials comprising a same thermoplastic polymer, are welded together.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, only some possible embodiments of the invention are described in detail. It is to be understood that these examples of embodiments may be modified in a number of ways and combined with each other whenever compatible and that certain features may be omitted in so far as they appear dispensable. The figures merely illustrate the principle of operation; numerous modifications are possible. The clamping system may be smaller or larger and in particular may surround, substantially on all sides, a space configured to receive a component.

Figure 1B:
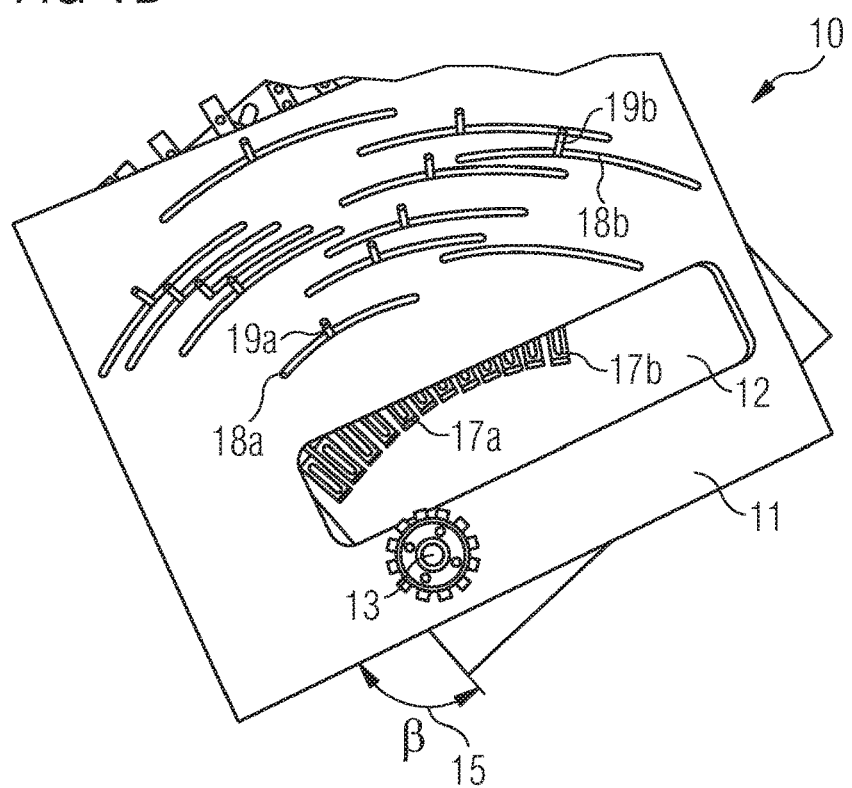
Figure 1C:
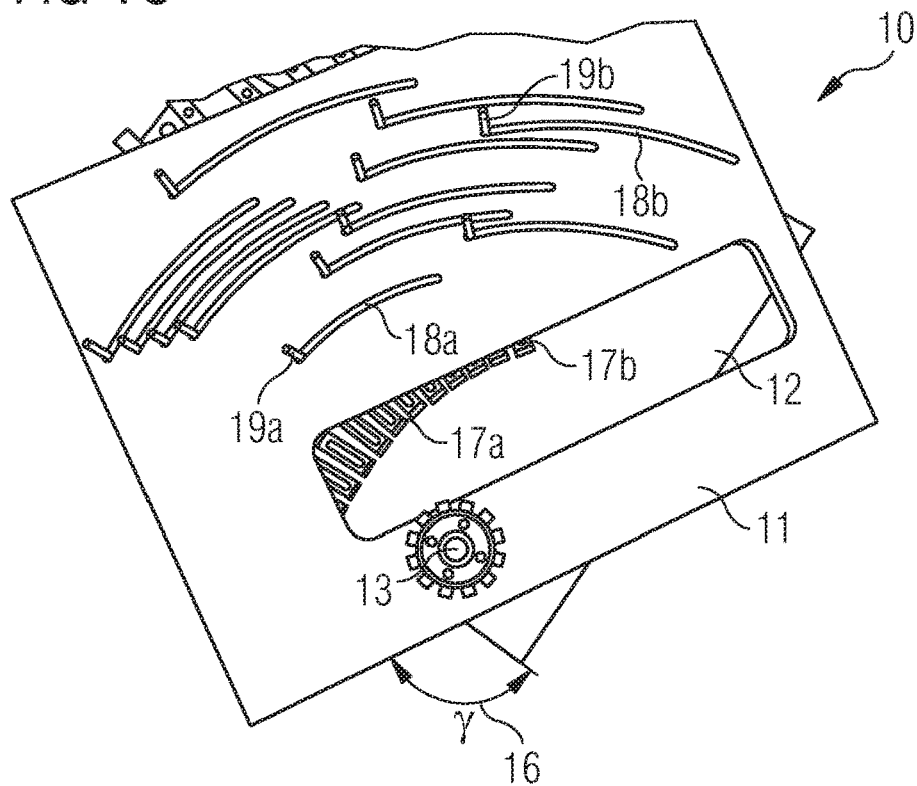

FIGS. 1A-C show an example of a clamping system 10 in different stages of operation according to some embodiments. FIG. 1A shows the clamping system 10 when the first member 11 and the second member 12 are at a first angle $\alpha$ 14, FIG. 1B shows the clamping system 10 when the first member 11 and the second member 12 are at an intermediate angle $\beta$ 15, and FIG. 1 C shows the clamping system 10 when the first member 11 and the second member 12 are at a second angle $\gamma$ 16. The space configured to receive the component is at the bottom end of the clamping system.

The clamping system 10 is for a component, especially for an article of footwear or a sports article and includes a first member 11 and a second member 12. The first member 11 and the second member 12 are rotatable relative to each other about a pivot 13 from a first angle 14 to a second angle 16. The clamping system 10 also includes; a first bracket 17a, wherein the first bracket 17a is adapted to slidably move along a first path 18a on the first member 11 and a second path (not shown in FIGS. 1A-1C, although see e.g., channels 22 in FIG. 3), by a first distance, on the second member 12, when the first member 11 and the second member 12 rotate relative to each other. The clamping system 10 also includes at least a second bracket 17b, wherein the second bracket 17b is adapted to slidably move along a third path 18b on the first member 11 and a fourth path 20b (visible in FIG. 1A but not in FIG. 1B or FIG. 1C), by a second distance, on the second member 12, when the first member 11 and the second member 12 rotate relative to each other.

In the present example, the clamping system 10 comprises further brackets, in this case a total of 12 brackets. The clamping system 10 allows the relative motion of each of the brackets to be controlled with a single operation, e.g., the relative rotation of the first member 11 and the second member 12. The brackets are arranged such as to form a convex void for receiving a convex component in at least one angular orientation of the first member 11 and the second member 12.

This motion may be seen from a comparison of FIGS. 1A-C, wherein FIG. 1A shows an "open" configuration of the clamping system 10, FIG. 1B an intermediate configuration, and FIG. 1C shows a "closed", e.g., engaging, configuration of the clamping system 10.

Therefore, the system is easy and fast to operate and may be adapted to different sizes of components simply by rotating the first member 11 relative to the second member 12. The first angle 14 and the second angle 16 are defined with respect to one, e.g., the same, suitable axis. In some embodiments, the first angle 14 and the second angle 16 are conveniently defined with respect to an edge of the first member 11 and the second member 12.

In some embodiments, the rotation axis about which the first member 11 and the second member 12 rotate is essentially perpendicular to the first member 11 and the second member 12. However, it is also possible that the rotation axis is tilted by a tilting angle with respect to a normal to the surface of the first member 11 and/or a normal to the surface of the second member 12.

The first path 18a, the second path, the third path 18b, and the fourth path 20b are located on a surface of the first member 11 or the second member 12, respectively. However, it is also possible that any one of the first path 18a, the second path, the third path 18b, and the fourth path 20b is located on an inside of the first member 11 and/or the second member 12. The first member 11 comprises a first plate and the second member 12 comprises a second plate.

The first path 18a is defined by a first slot arranged in the first member 11 and the third path 18b is defined by a second slot arranged in the first member 11. However, other arrangements are possible. For example, the first path 18a may be defined by a first guide rail or a first pair of guide rails and the third path 18b may be defined by a second guide rail or a second pair of guide rails.

The first bracket 17a is attached to a first pin 19a and the second bracket 17b is attached to a second pin 19b, wherein the first 19a and the second pin 19b are arranged in the first slot and the second slot, respectively. The pins have approximate rotational symmetry such as to facilitate low-friction sliding in the first and second slot, respectively. In particular, the first bracket 17a is essentially rigidly attached to the first pin 19a, and the second bracket 17b is essentially rigidly attached to the second pin 19b.

In some embodiments, neither the first pin 19a nor the second pin 19b comprises components for attaching the first pin 19a and the second pin 19b to the first member 11 such that the first pin 19a and the second pin 19b may slide along the first slot or the second slot, respectively, but cannot move out of the first slot or the second slot, respectively. However, in other embodiments, the first pin 19a and/or the second pin 19b may comprise such components.

The second path (not shown) is defined by a first channel (not shown) arranged in the second member 12 and the fourth path 20b (visible in FIG. 1A but not in FIG. 1B or FIG. 1C) is defined by a second channel arranged in the second member 12. The channels are an indentation or recess that may or may not extend from a surface to an opposing surface on the second member 12. However, other arrangements are possible. For example, the second path may be defined by a third guide rail or a third pair of guide rails and the fourth path 20b may be defined by a fourth guide rail or a fourth pair of guide rails.

The first bracket 17a and the second bracket 17b are rotatable with respect to the first member 11 and the second member 12. This additional degree of freedom allows a better grip of the first bracket 17a and the second bracket 17b of the component.

Rotation of the first member 11 relative to the second member 12 from the first angle 14 to the second angle 16 causes the first bracket 17a and the second bracket 17b to move towards the component (component not shown). Therefore, the clamping system 10 engages the component when rotating the first member 11 relative to the second member 12 from the first angle 14 to the second angle 16.

In some embodiments, the second distance may be greater than the first distance. In other words, the first bracket 17a and the second bracket 17b may move in a non-symmetric, non-circular manner, when rotating the first member 11 relative to the second member 12. This may be seen very well by comparing FIGS. 1A-C, which shows that the second bracket 17b moves a lot more than the first bracket 17a. In some embodiments, many components have an irregular shape. Therefore, the differences between different sizes of a component may be greater in some areas than in other areas. Therefore, the accuracy of the grip for different sizes of components may be improved.

Rotation of the first member 11 relative to the second member 12 from the first angle 14 to the second angle 16 causes the first bracket 17a to move towards the second bracket 17b. In some embodiments, the first bracket 17a and the second bracket 17b may be located on opposite sides of the component.

In some embodiments, the first path 18a comprises a first essentially circular segment and the third path 18b comprises a second essentially circular segment. In particular the first path 18a and the third path 18b are sections of a circle, rather than a complete circle. The first path 18a and the third path 18b are not concentric. The first path 18a has a first center and the third path 18b has a third center and the first center is displaced by a first displacement vector from the pivot 13 and the third center is displaced by a third displacement vector from the pivot 13 that is not identical to the first displacement vector. The third displacement vector has a larger magnitude than the first displacement vector.

However, it is important to understand, that a different movement of the first bracket 17a and the second bracket 17b, e.g., with a second distance that is greater than the first distance, may equally be achieved for other shapes of the first path 18a and third path 18b.

In some embodiments, the component (not shown) is a sole element of an article of footwear, for example, such that the second bracket 17b is configured to contact a forefoot portion of the sole element and such that the first bracket 17a is configured to contact a rearfoot portion of the sole element.

In some embodiments, the first bracket 17a, the second bracket 17b, the first member 11, and the second member 12 comprise aluminium.

In some embodiments, the pivot 14 is determined by a rotary mechanism located at the pivot 14 itself, e.g., located near the final position of the first bracket 17a and some of the other brackets. However, in some embodiments, it is possible to move the mechanical rotary mechanism to another position, e.g., around an outside of the clamping system, while maintaining the pivot in the same position. For example, this may be done by an essentially-circular guiding wheel arranged at an outside of the clamping system, wherein a rotation center of the guiding wheel is located at the pivot. This may provide more space for a component to be secured by the clamping system.

Figure 2:
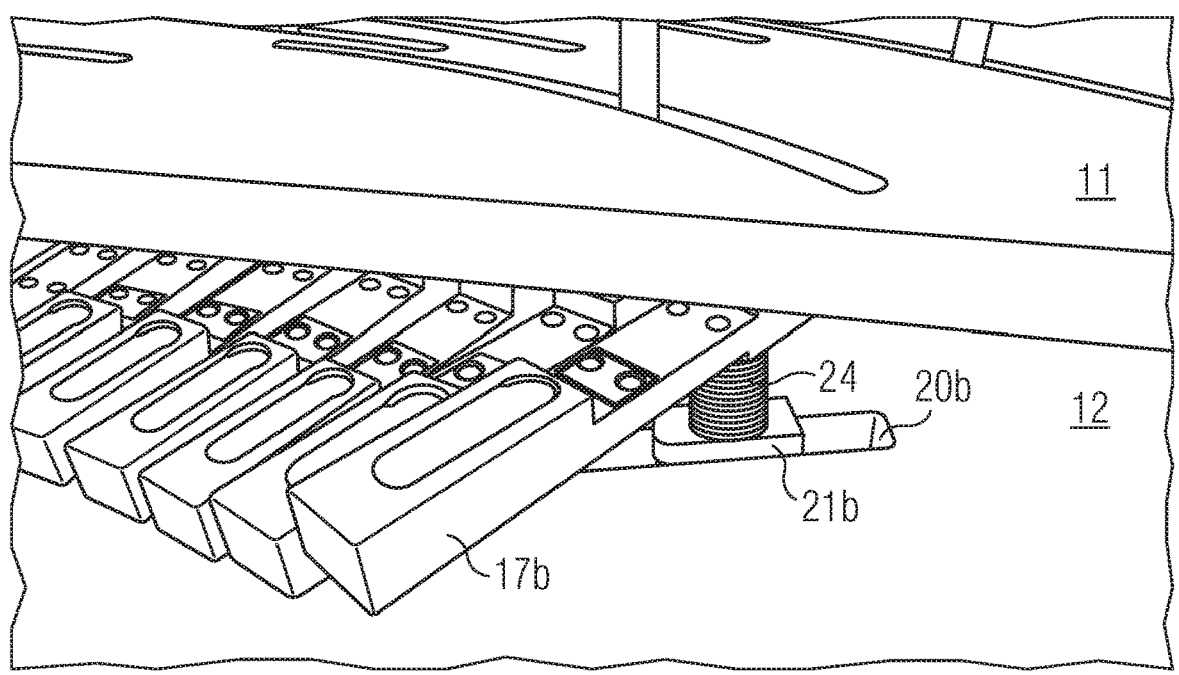
FIG. 2 shows a close-up lateral view of the clamping system shown in FIGS. 1A-C according to various embodiments.

FIG. 2 shows a close-up lateral view of the clamping system 10 shown in FIGS. 1A-C.

In particular, FIG. 2 shows the second channel 20b arranged in the second member 12. In some embodiments, the first bracket 17a is attached to a first slider (not shown in FIG. 2) and the second bracket 17b is attached to a second slider 21b. In some embodiments, the first slider and the second slider 21b are respectively arranged in the first channel and the second channel 20b. In some embodiments, the first bracket 17a is further attached to a third slider arranged in a third channel (not shown in FIG. 2) and the second bracket 17b is further attached to a fourth slider arranged in a fourth channel (not shown in FIG. 2). The third channel may be essentially parallel to the first channel and the fourth channel may be essentially parallel to the second channel. The first, second, third, and fourth sliders may be essentially similar. In particular, the first bracket 17a may be essentially rigidly attached to the first slider and the third slider, and the second bracket 17b may be essentially rigidly attached to the second slider 21b and the fourth slider. The sliders may lack rotational symmetry such as to prevent rotation of the first bracket 17a and the second bracket 17b with respect to the second member 12. The non-rotationally-symmetric sliders may be attached to the first bracket 17a and the second bracket 17b, respectively, using a spacer 24.

Figure 3:
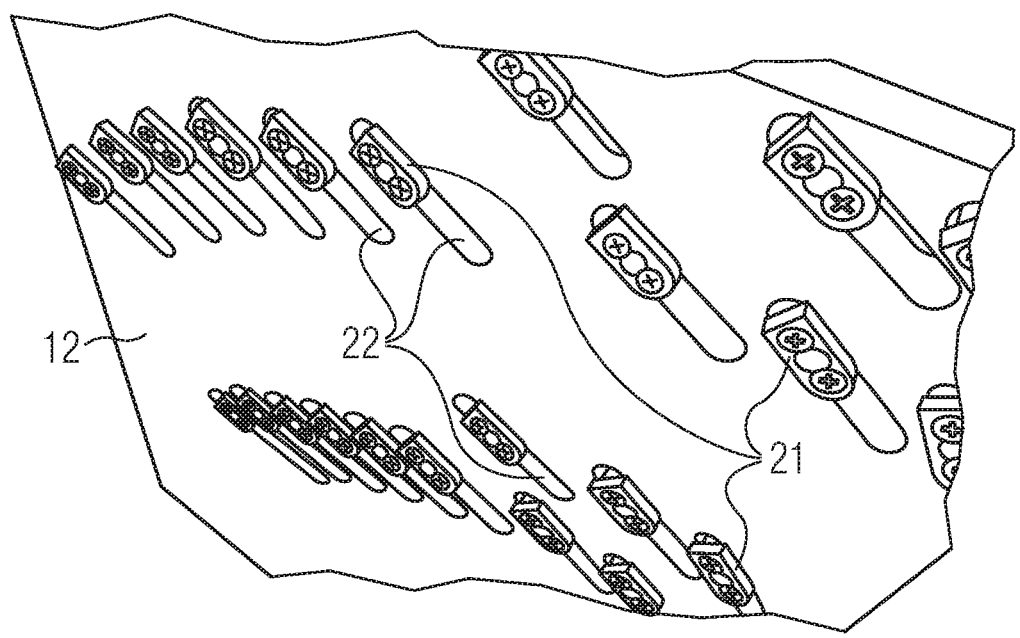
FIG. 3 shows a close-up view of a second member of the clamping system shown in FIGS. 1A-C according to various embodiments.

FIG. 3 shows a close-up view of a bottom side of the second member 12 of the clamping system 10 shown in FIGS. 1A-C.

FIG. 3 shows a plurality of channels 22. In some embodiments, there is more than one channel 22 per bracket. Each path in the second member 12, including the second path and the fourth path 20b, may be essentially linear.

Each slider 21, including the first slider and the second slider, may further comprise components for attaching the slider 21 to the second member 12 such that the slider 21 may slide along the respective channel 22, but cannot move out of the respective channel 22. In some embodiments, each slider 21 contains two parts, an upper part and a lower part which form a groove in between. The upper and lower part of each slider 21 may be fixed to each other using two screws. This allows an easy way of securing the sliders.

In some embodiments, the sliders comprise polytetrafluoroethylene (PTFE) in the bulk of any of these parts.

Figure 4:
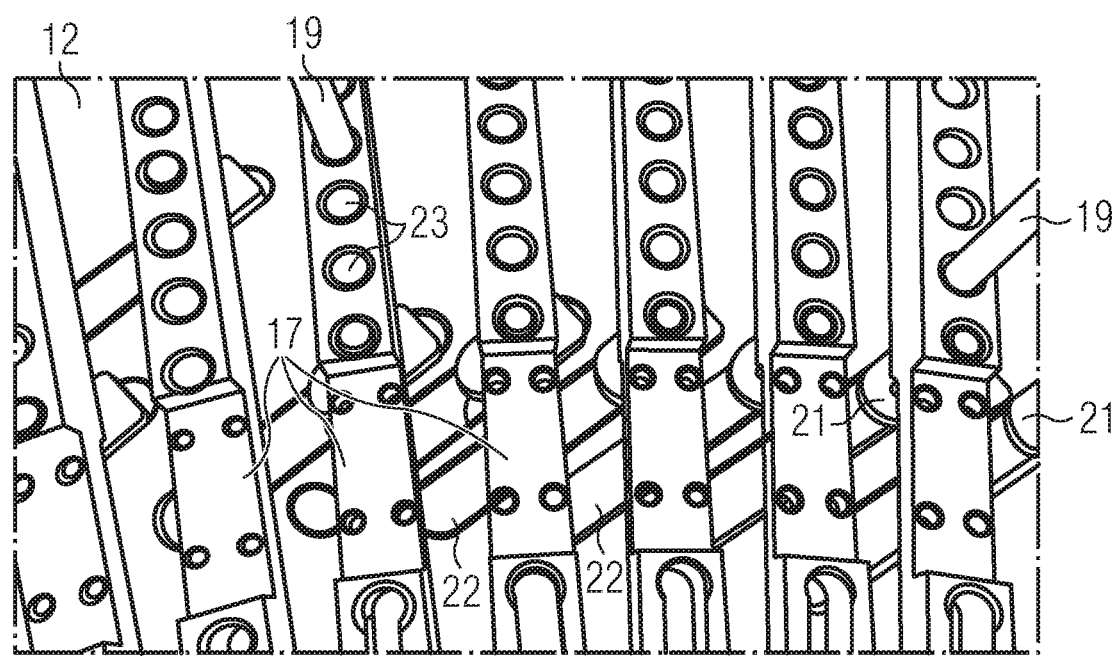
FIG. 4 shows a close-up view of part of the brackets and channels of the clamping system shown in FIGS. 1A-C according to various embodiments.

FIG. 4 shows a close-up view of part of the brackets 17 and channels 22 of the clamping system 10 shown in FIGS. 1A-C. In particular, to further improve the adjustability of the system, the brackets 17 may each contain several small recesses 23. This way, the position of a pin 19 connected to a bracket 17 (and/or a slider 21 connected to the bracket 17) may be adjusted in order to further improve the grip of a component. The ends of the brackets 17 configured to engage the component are at the bottom end of FIG. 4.

Figure 5:
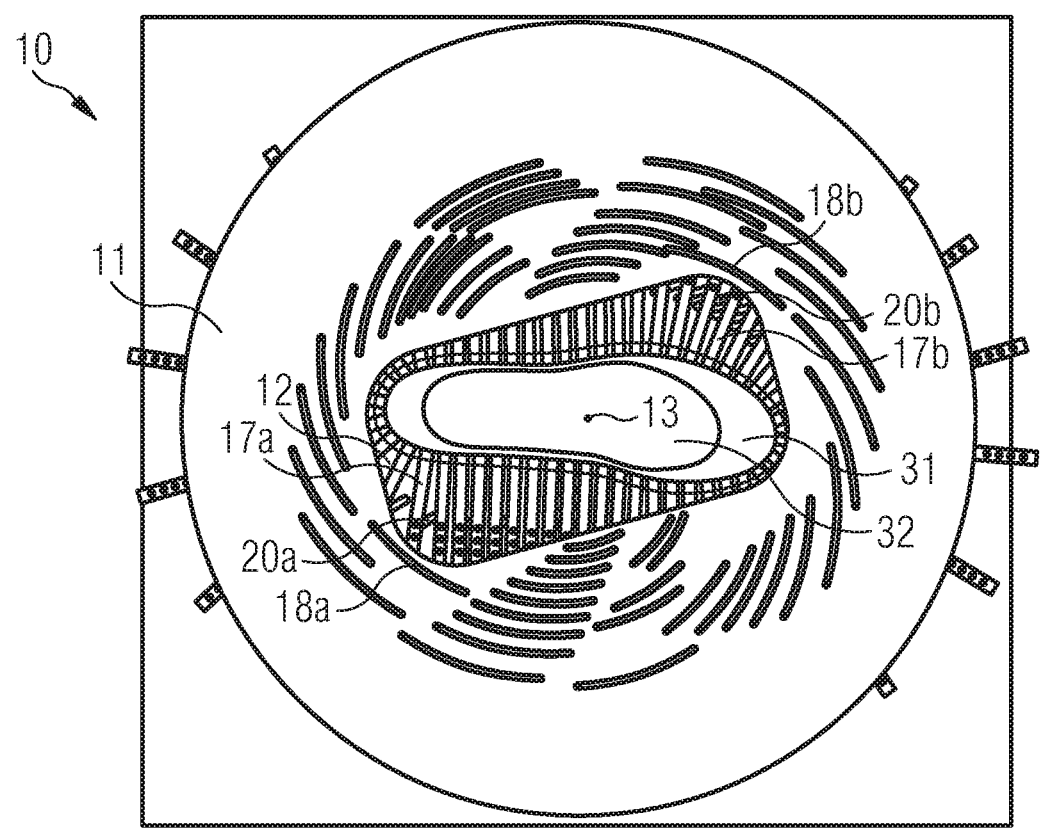
FIG. 5 shows another example of a clamping system according to various embodiments.

FIG. 5 shows another clamping system 10 according to some embodiments. The clamping system 10 is similar to the clamping system shown in FIGS. 1A-C and FIG. 2.

The clamping system 10 is for a component 31, 32, such as for an article of footwear or a sports article. The clamping system may comprise (a) a first member 11; (b) a second member 12, wherein the first member 11 and the second member 12 are rotatable relative to each other about a pivot 13 from a first angle to a second angle; (c) a first bracket 17a, wherein the first bracket 17a is adapted to slidably move along a first path 18a on the first member 11 and a second path 20a, by a first distance, on the second member 12, when the first member 11 and the second member 12 rotate relative to each other; and (d) at least a second bracket 17b, wherein the second bracket 17b is adapted to slidably move along a third path 18b on the first member 11 and a fourth path 20b, by a second distance, on the second member 12, when the first member 11 and the second member 12 rotate relative to each other.

In some embodiments, the clamping system 10 comprises a plurality of brackets 17. The clamping system 10 is shown in an angular orientation, in which the plurality of brackets 17 engages the component 31, which, in this case, is a large sole element. An overlay shows a small component 32, in this case a small sole element 32, to illustrate the location of the plurality of brackets when the clamping system 10 is rotated further, in order to engage a small component 32 instead of a large component 31.

The brackets 17 are arranged so as to form a void that has a mixed convex and concave shape for receiving a component 31, 32 that has a mixed convex and concave shape.

Figure 6A:
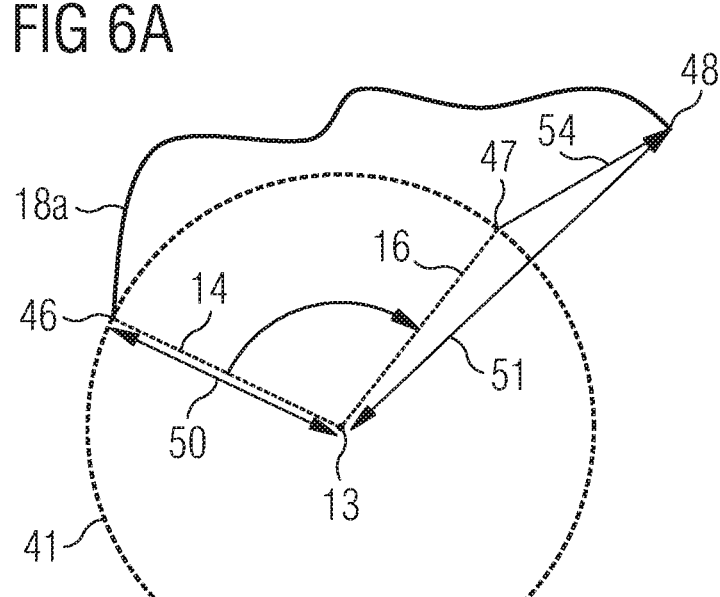
FIGS. 6A-B illustrate an aspect of a clamping system in the reference frame of the first member according to various embodiments.

FIG. 6A illustrates an example of how the displacement of the first bracket upon rotation of the first member relative to the second member from the first angle 14 to the second angle 16 may be determined and engineered. FIG. 6A shows a first path 18a on the first member, although it is to be understood that this could be equally a third path, for example. FIG. 6A is drawn in the reference frame of the first member.

The first path 18a comprises a first position 46 and a second position 48, wherein the first position 46 is located at a first-position distance 50 from the pivot 13 and the second position 48 is located at a second-position distance 51 from the pivot 13, wherein first-position distance 50 is smaller than the second-position distance 51, although the first-position distance 50 could alternatively be larger than the second-position distance 51.

FIG. 6A illustrates the rotation of the clamping system 10 from a first angle 14 to a second angle 16 about a pivot 13. Any object that is fixedly attached to the first member will therefore traverse a circular path in the plane of rotation, for example at least part of the circular path of rotation 41, or circle 41, with respect to the second member. It is to be understood that any circular path centered on the pivot, for example circle 41, is the same in the reference frame of the first member and the second member, since a circular path centered on the pivot is invariant under rotation about the pivot.

Numerous shapes of the first path 18a are possible. Physically, the first position 46 may, for example, be defined by a first pin. A circular path of rotation 41 centered on the pivot 13 is drawn through the first position 46. The first position 46 coincides with the starting position on the circle 46, defined by the first angle 14. A final position 47 on the circular path of rotation 41, in the reference frame of the first member, is then given by the second angle 16. A desired first bracket displacement vector 54 is defined, depending on the size and shape of the component to be clamped. In some embodiments, the first bracket displacement vector 54 comprises a radial component and a non-radial component. The vector sum of the final position 47 on the circle and the first bracket displacement vector 54 determines the second position 48 of the bracket on the first path 18a. Since the first and second angle are defined with respect to the relative orientation of the first member and the second member, the angle between the first position of the first bracket and the second position of the first bracket, both determined with respect to the pivot, is different to the difference between the first and second angle, because the first bracket displacement vector further comprises a non-radial component. The magnitude of the first bracket displacement vector 54 is the first distance, which is determined with respect to the second member.

The shape of the first path determines the speed of movement of the bracket per unit of change in angular rotation, measured, for example, in mm/°, which may be not constant, but may instead depend on the rotation angle.

Figure 6B:
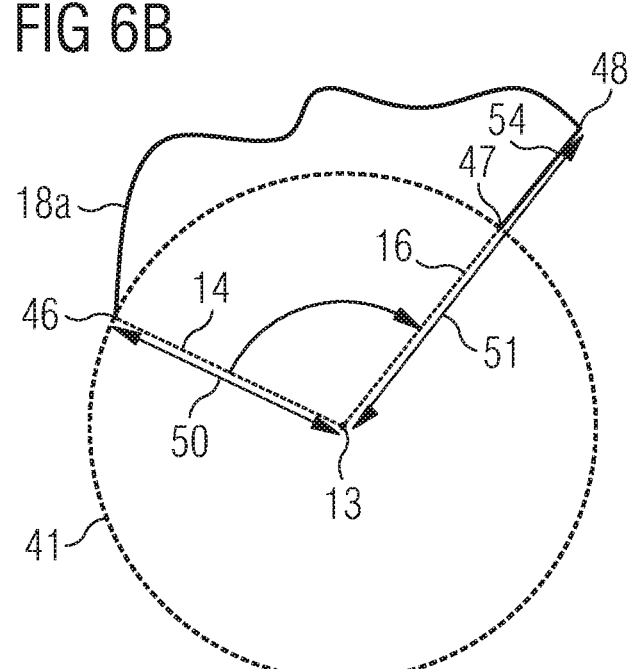

FIG. 6B illustrates another example of how the displacement of the first bracket upon rotation of the first member relative to the second member from the first angle 14 to the second angle 16 may be determined and engineered. FIG. 6B is drawn in the reference frame of the first member. The example of FIG. 6B is substantially similar to the example of FIG. 6A, except that in the example of FIG. 6B the first bracket displacement vector 54 comprises only a radial component and does not comprise a non-radial component. Therefore, in the example of FIG. 6B, the angle between the first position of the first bracket and the second position of the first bracket, both determined with respect to the pivot, is identical to the difference between the first and second angle, because the first bracket displacement vector does not comprise a non-radial component.

Figure 7A:
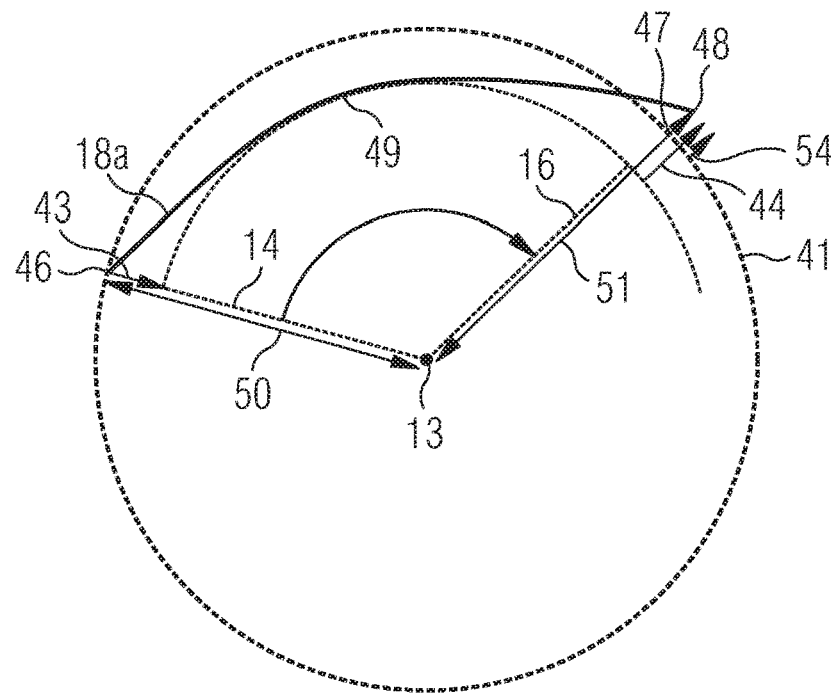
FIGS. 7A-B illustrate an aspect of another example of a clamping system in the reference frame of the first member according to various embodiments.

FIG. 7A illustrates an aspect of another clamping system according to some embodiments. FIG. 7A shows a first path 18a on the first member, although it is to be understood that this could equally be a third path, for example. FIG. 7A is drawn in the reference frame of the first member.

The first path 18a comprises a first position 46 and a second position 48, wherein the first position 46 is located at a first-position distance 50 from the pivot 13 and the second position 48 is located at a second-position distance 51 from the pivot 13, wherein first-position distance 50 is smaller than the second-position distance 51. The first position 46 on the first path 18a coincides with the starting position 46 on the circular path 41, which is determined by the first angle 14. The final position on the circular path 41 is indicated by reference numeral 47 and is determined by the second angle 16.

The example shown in FIG. 7A is similar to the example shown in FIG. 6B. However, in the example of FIG. 7A, the first path 18a comprises a first essentially circular segment 49. The first path comprises a first position 46 located at the first end 46, and a second position 48 is located at the second end 48, wherein the first path 18a deviates from an essentially circular shape 41 at the first end 46 by a first deviation vector 43 and at the second end 48 by a second deviation vector 44. The center of the first essentially circular segment 49 is located at the pivot 13. Therefore, the difference between the magnitude of the first deviation vector 43 and the magnitude of the second deviation vector 44 yields the first bracket displacement vector 54, which, in the example of FIG. 7A, is oriented along a radial direction.

Figure 7B:
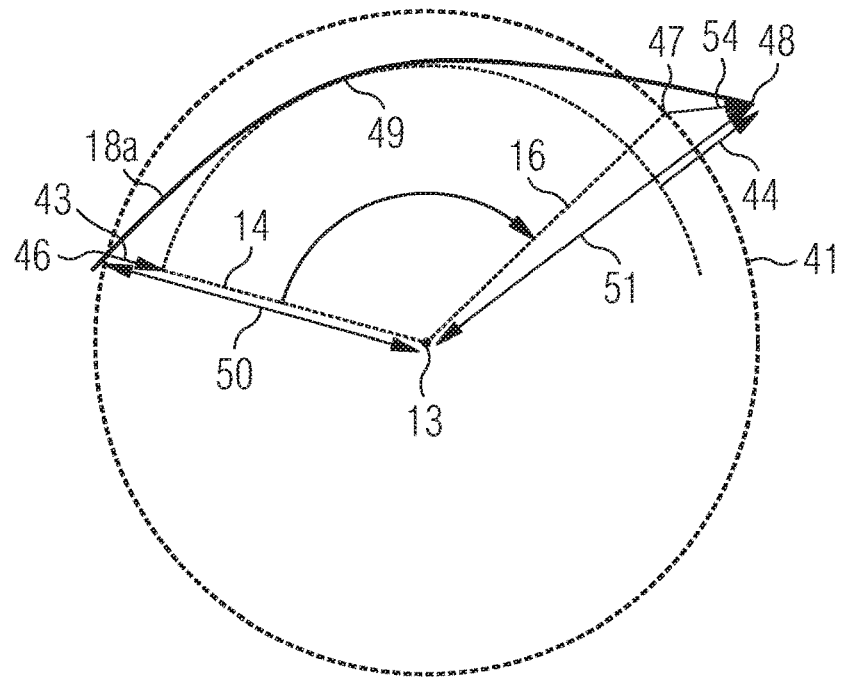

FIG. 7B illustrates a similar example to the example shown in FIG. 7A. However, in the example of FIG. 7B, the first bracket displacement vector 54 further comprises a non-radial component.

Figure 8A:
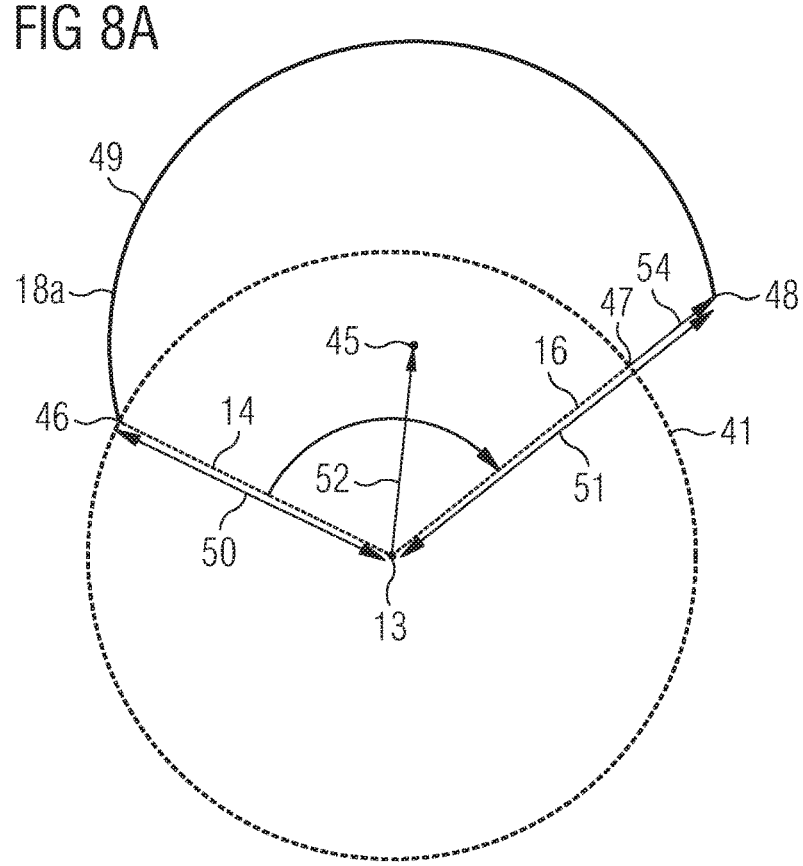
FIGS. 8A-B illustrate an aspect of another example of a clamping system in the reference frame of the first member according to various embodiments.

FIG. 8A illustrates an aspect of another clamping system according to some embodiments. FIG. 8A shows a first path 18a, although it is to be understood that this could equally be a third path, for example. FIG. 8A is drawn in the reference frame of the first member.

The first path 18a comprises a first position 46 and a second position 48, wherein the first position 46 is located at a first-position distance 50 from the pivot 13 and the second position 48 is located at a second-position distance 51 from the pivot 13, wherein first-position distance 50 is smaller than the second-position distance 51. The first position 46 on the first path 18a coincides with the starting position 46 on the circular path 41, which is determined by the first angle 14. The final position on the circular path is indicated by reference numeral 47 and is determined by the second angle 16.

In some embodiments, the first path 18a comprises a first essentially circular segment 49. In this case, the first path 18a is essentially circular over its whole length. The center 45 of the first path 18a, e.g., of the first segment 49, is displaced by a first displacement vector 52 from the pivot 13. The clamping system is rotated from the first angle 14 to the second angle 16. In some embodiments, the first bracket displacement vector 54 comprises a radial component only.

In regard of a third path (not shown), the third path may analogously comprise a second essentially circular segment. The first segment and the second segment may not be concentric. The second segment may have a second center and the second center may be displaced by a second displacement vector from the pivot 13 that is not identical to the first displacement vector 52. The second displacement vector may have a larger magnitude than the first displacement vector 52.

Figure 8B:
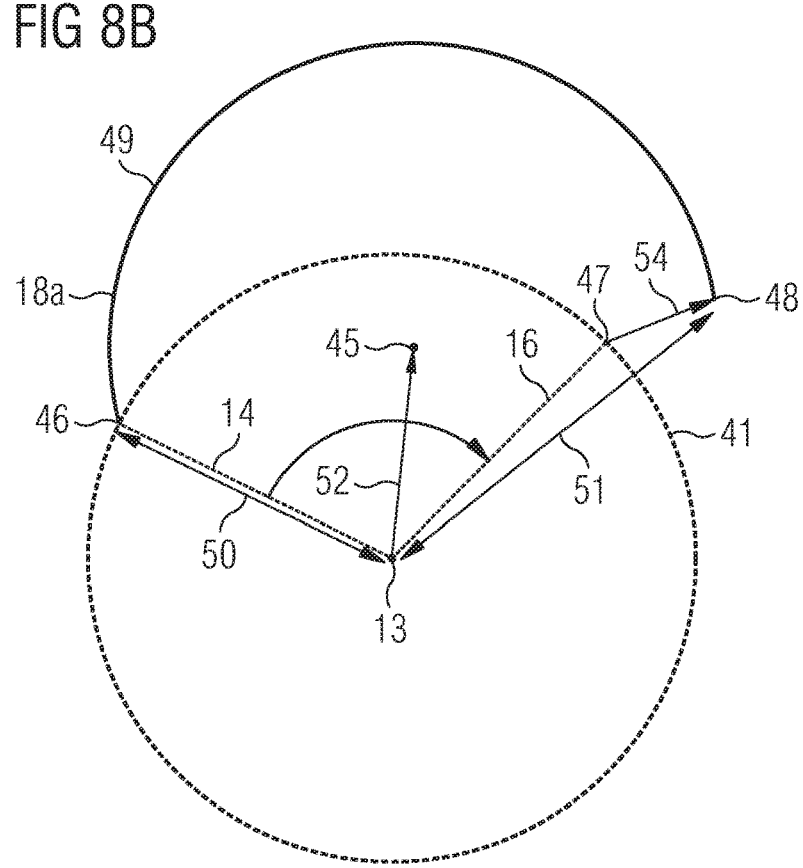

FIG. 8B illustrates a similar example to the example shown in FIG. 8A. However, in the example of FIG. 8B, the first bracket displacement vector 54 displacement vector further comprises a non-radial component.

While the first bracket displacement vectors shown in FIGS. 6-8 all comprise a radial component, it is to be understood that this is not essential for some embodiments. The first bracket displacement vector may comprise only a non-radial component.

Figure 9:
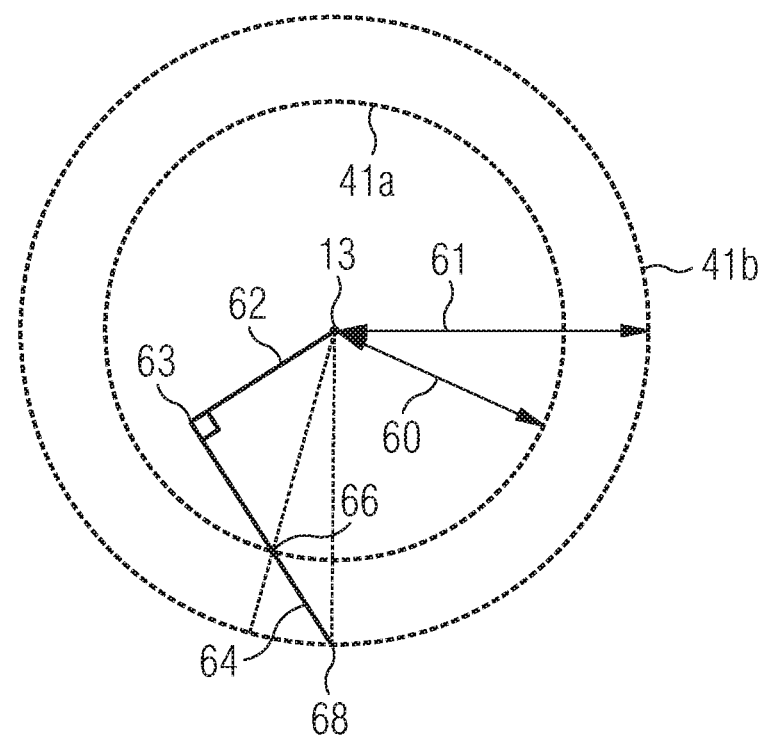
FIG. 9 illustrates an aspect of another example of a clamping system in the reference frame of the second member according to various embodiments.

FIG. 9 illustrates an aspect of another clamping system according to the some embodiments. FIG. 9 is drawn in the reference frame of the second member, unlike FIG. 6-8, which are drawn in the reference frame of the first member.

A corresponding first position 66 of a first bracket is shown. The corresponding first position 66 corresponds to the first position of the first bracket in the reference frame of the first member. A corresponding second position 68 of the first bracket is shown, which corresponds to the second position in the reference frame of the first member. A desired corresponding first bracket displacement vector 64 is defined, depending on the size and shape of the component to be clamped. The corresponding first bracket displacement vector 64 determines the magnitude and direction of the displacement of the first bracket with respect to the second member. The magnitude of the corresponding first bracket displacement vector 64 in the reference frame of the second member is identical to the magnitude of the first bracket displacement vector it corresponds to in the reference frame of the first member. The direction of the corresponding first bracket displacement vector 64 in the reference frame of the second member is parallel to the direction of the first bracket displacement vector it corresponds to in the reference frame of the first member, when the first member and the second member are at the second angle relative to each another. In practice one may, for example, first define a corresponding first bracket displacement vector 64 in the reference frame of the second member and then define the first bracket displacement vector in the reference frame of the first member, which corresponds to the corresponding first bracket displacement vector 64 in the reference frame of the second member.

A first circular path 41a centered on a pivot 13 is drawn at a first radius 60, $r_1$ which corresponds to the radial distance of the corresponding first position 66 from the pivot

13. A second circular path 41*b* centered on a pivot 13 is drawn at a second radius 61, $r_2$, which corresponds to the radial distance of the corresponding second position 68 from the pivot 13.

As may be seen from FIG. 9, the corresponding first bracket displacement vector 64 is not arranged in a radial direction. Instead, it is arranged pointing towards an offset position 63 located at an offset distance 62, $d_0$, from the pivot 13.

The first distance $d_1$ is the magnitude of the corresponding first bracket displacement vector 64 and is given by $$d_1 = \sqrt{r_2^2 - d_0^2} - \sqrt{r_1^2 - d_0^2}$$

The concepts illustrated with reference to FIGS. 6-9 serve to illustrate just some possible ways of engineering the first, second, third, and fourth path in order to effect a particular, desired displacement of a first or second brackets, or further brackets, if present.

In the following, further examples are described to facilitate the understanding of the invention:

Example 1

A clamping system (10) for a component (31, 32), especially for an article of footwear or a sports article, comprising:
 (a) a first member (11);
 (b) a second member (12),
 (c) wherein the first member (11) and the second member (12) are rotatable relative to each other about a pivot (13);
 (d) a first bracket (17*a*), wherein the first bracket (17*a*) is adapted to slidably move at least partly along a first path (18*a*) on the first member (11) and at least partly along a second path (20*a*), by a first distance, on the second member (12), when the first member (11) and the second member (12) are rotated relative to each other from a first angle (14) to a second angle (16); and
 (e) at least a second bracket (17*b*), wherein the second bracket (17*b*) is adapted to slidably move at least partly along a third path (18*b*) on the first member (11) and at least partly along a fourth path (20*b*), by a second distance, on the second member (12), when the first member (11) and the second member (12) are rotated relative to each other from the first angle (14) to the second angle (16).

Example 2

The clamping system (10) according to the preceding claim, wherein the first member (11) comprises a first plate and the second member (12) comprises a second plate.

Example 3

The clamping system (10) according to the preceding claim, wherein the first path (18*a*) is defined by a first slot arranged in the first member (11) and wherein the third path (18*b*) is defined by a second slot arranged in the first member (11).

Example 4

The clamping system (10) according to the preceding claim, wherein the first bracket (17*a*) is attached to a first pin (19*a*) and/or the second bracket (17*b*) is attached to a second pin (19*b*), wherein the first (19*a*) and/or the second pin (19*b*) is/are arranged in the first slot or the second slot, respectively.

Example 5

The clamping system (10) according to the preceding claim, wherein the first pin (19*a*) and/or the second pin (19*b*) further comprises components for attaching the first pin (19*a*) and/or the second pin (19*b*) to the first member (11) such that the first pin (19*a*) and/or the second pin (19*b*) may slide along the first slot or the second slot, respectively, but cannot move out of the first slot or the second slot, respectively.

Example 6

The clamping system (10) according to one of the preceding claims, wherein the second path (20*a*) is defined by a first channel arranged in the second member (12) and wherein the fourth path (20*b*) is defined by a second channel arranged in the second member (12).

Example 7

The clamping system (10) according to the preceding claim, wherein the first bracket (17*a*) is attached to a first slider and/or the second bracket (17*b*) is attached to a second slider (21*b*), wherein the first and/or the second slider (21*b*) is/are arranged in the first channel or the second channel, respectively.

Example 8

The clamping system (10) according to the preceding claim, wherein the first slider and/or the second slider (21*b*) further comprises components for attaching the first slider and/or the second slider (21*b*) to the second member (12) such that the first slider and/or the second slider (21*b*) may slide along the first channel or the second channel, respectively, but cannot move out of the first channel or the second channel, respectively.

Example 9

The clamping system (10) according to one of claim 7 or 8, wherein the first bracket (17*a*) is further attached to a third slider arranged in a third channel and/or the second bracket (17*b*) is further attached to a fourth slider arranged in a fourth channel, wherein the third and fourth channel are arranged in the second member (12).

Example 10

The clamping system (10) according to one of the preceding claims, wherein rotation of the first member (11) relative to the second member (12) from the first angle (14) to the second angle (16) causes the first bracket (17*a*) and/or the second bracket (17*b*) to move towards the component (31, 32).

Example 11

The clamping system (10) according to one of the preceding claims, wherein the second distance is greater than the first distance.

Example 12

The clamping system (10) according to one of the preceding claims, wherein rotation of the first member (11) relative to the second member (12) from the first angle (14) to the second angle (16) causes the first bracket (17*a*) to move towards the second bracket (17*b*).

Example 13

The clamping system (10) according to one of the preceding claims, wherein the second path (20*a*) and the fourth path (20*b*) are essentially linear.

Example 14

The clamping system (10) according to one of the preceding claims, wherein the first path (18*a*) comprises a first position (46) and a second position (48), wherein the first position (46) is located at a first-position distance (50) from the pivot (13) and the second position (48) is located at a second-position distance (51) from the pivot (13), wherein first-position distance (50) is different from the second-position distance (51); and/or wherein the third path (18*b*) comprises a third position and a fourth position, wherein the third position is located at a third-position distance from the pivot (13) and the fourth position is located at a fourth-position distance from the pivot (13), wherein the third-position distance is different from the fourth-position distance.

Example 15

The clamping system (10) according to one of the preceding claims, wherein the first path (18*a*) comprises a first essentially circular segment and/or the third path (18*b*) comprises a second essentially circular segment.

Example 16

The clamping system (10) according to the preceding claim, wherein the first segment (49) and the second segment are not concentric.

Example 17

The clamping system (10) according to the preceding claim, wherein the first segment (49) has a first center and the second segment has a second center, and wherein, the first center is displaced by a first displacement vector (52) from the pivot (13) and the second center is displaced by a second displacement vector from the pivot (13) that is not identical to the first displacement vector (52).

Example 18

The clamping system (10) according to the preceding claim, wherein the second displacement vector has a larger magnitude than the first displacement vector (52).

Example 19

The clamping system (10) according to one of the preceding claims, wherein the clamping system (10) comprises at least three brackets and wherein the three brackets are arranged such as to form a convex void for receiving a convex component (31, 32) in at least one angular orientation of the first (11) and second member (12).

Example 20

The clamping system (10) according to the preceding claim, wherein the component (31, 32) is a sole element (31, 32) of an article of footwear.

Example 21

The clamping system (10) according to the preceding claim, wherein the second bracket (17*b*) is configured to contact a forefoot portion of the sole element and the first bracket (17*a*) is configured to contact a rearfoot portion of the sole element.

Example 22

The clamping system (10) according to one of the preceding claims, wherein at least one of: the first bracket (17*a*), the second bracket (17*b*), the first element, or the second element, comprises a metal.

Example 23

A method of securing a component (31, 32), especially for an article of footwear or a sports article, comprising using a clamping system (10) according to one of the preceding claims.

Example 24

The method according to the preceding claim, wherein the using comprises:
(a) rotating the first plate to the first angle relative to the second plate;
(b) arranging the component (31, 32) proximate to the first (17*a*) and the second bracket (17*b*); and
(c) rotating the first plate to the second angle relative to the second plate such that the first (17*a*) and/or the second bracket (17*b*) touches the component (31, 32).

Example 25

A method of producing a shoe comprising a method according to one of claim 22 or 23, wherein the component (31, 32) is a sole element (31, 32).

Example 26

The method according to the preceding claim, wherein the sole element comprises a midsole.

Example 27

The method according to one of claim 24 or 25, further comprising attaching a portion of an upper to the sole element, when the sole element is secured in the clamping system (10).

Example 28

The method according to the preceding claim, wherein the attaching comprises welding.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A clamping system for an article of footwear or a sports article, the clamping system comprising:
   a first member;
   a second member,
   a pivot about which the first member and the second member are rotatable relative to each other;
   a first bracket slidably movable a first distance at least partly along a first path on the first member and at least partly along a second path on the second member when the first member and the second member are rotated relative to each other from a first angle to a second angle; and
   at least a second bracket slidably movable a second distance at least partly along a third path on the first member and at least partly along a fourth path on the second member when the first member and the second member are rotated relative to each other from the first angle to the second angle, wherein rotation from the first angle to the second angle causes a magnitude of the second distance traveled by the second bracket along the third path to be greater than a magnitude of the first distance traveled by the first bracket along the first path.

2. The clamping system of claim 1, wherein the first member comprises a first plate; wherein the second member comprises a second plate;
   wherein the first path is defined by a first slot arranged in the first member;
   wherein the third path is defined by a second slot arranged in the first member;
   wherein the second path is defined by a first channel arranged in the second member; and
   wherein the fourth path is defined by a second channel arranged in the second member.

3. The clamping system of claim 2, wherein at least one of:
   the first bracket is attached to a first pin arranged in the first slot;
   the second bracket is attached to a second pin arranged in the second slot;
   the first bracket is attached to a first slider arranged in the first channel; or
   the second bracket is attached to a second slider arranged in the second channel.

4. The clamping system of claim 3, wherein at least one of:
   the first pin is attached to the first member such that the first pin is slidable along the first slot, but cannot move out of the first slot;
   the second pin is attached to the first member such that the second pin is slidable along the second slot, but cannot move out of the second slot;
   the first slider is attached to the second member such that the first slider is slidable along the first channel but cannot move out of the first channel; or
   the second slider is attached to the second member such that the second slider is slidable along the second channel but cannot move out of the second channel.

5. The clamping system of claim 3, wherein at least one of:
   the first bracket is further attached to a third slider arranged in a third channel arranged in the second member; or
   the second bracket is further attached to a fourth slider arranged in a fourth channel arranged in the second member.

6. The clamping system of claim 1, wherein the rotation of the first member relative to the second member from the first angle to the second angle causes at least one of the first bracket or the second bracket to move towards the article of footwear or the sports article.

7. The clamping system of claim 1, wherein the rotation of the first member relative to the second member from the first angle to the second angle causes the first bracket to move towards the second bracket.

8. The clamping system of claim 1, wherein the second path and the fourth path are essentially linear.

9. The clamping system of claim 1,
   wherein the first path comprises a first position and a second position, wherein the first position is located at a first-position distance from the pivot and the second position is located at a second-position distance from the pivot, and wherein the first-position distance is different from the second-position distance; or
   wherein the third path comprises a third position and a fourth position, wherein the third position is located at a third-position distance from the pivot and the fourth position is located at a fourth-position distance from the pivot, and wherein the third-position distance is different from the fourth-position distance.

10. The clamping system of claim 1, wherein at least one of:
    the first path comprises a first essentially circular segment; or
    the third path comprises a second essentially circular segment.

11. The clamping system of claim 10, wherein the first segment and the second segment are not concentric.

12. The clamping system of claim 10, wherein the first segment has a first center, wherein the second segment has a second center, wherein the first center is displaced by a first displacement vector from the pivot, and wherein the second center is displaced by a second displacement vector from the pivot that is not identical to the first displacement vector.

13. The clamping system of claim 12, wherein the second displacement vector has a larger magnitude than the first displacement vector.

14. The clamping system of claim 1, wherein the clamping system comprises at least three brackets, and wherein the at least three brackets are arranged so as to form a convex void for receiving a convex component in at least one angular orientation of the first and second member.

15. The clamping system of claim 14, wherein the article of footwear or the sports article is a footwear sole element, and wherein the second bracket is configured to contact a forefoot portion of the footwear sole element, and wherein the first bracket is configured to contact a rearfoot portion of the footwear sole element.

16. A method of securing a component of an article of footwear or of a sports article, the method comprising:
    rotating a first plate to a first angle relative to a second plate of a system that includes the first plate; the second plate; a first bracket slidably movable at least partly along a first path on the first plate by a first distance and at least partly along a second path on the second plate in response to the rotating; and a second bracket slidably movable at least partly along a third path on the first plate by a second distance and at least partly along a fourth path on the second plate in response to the rotating; wherein said rotating causes a magnitude of the second distance moved by the second bracket along the third path to be greater than a magnitude of the first distance moved by the first bracket along the first path;

arranging the component proximate to the first bracket and the second bracket; and rotating the first plate to a second angle relative to the second plate such that at least one of the first bracket or the second bracket touches the component.

17. The method of claim 16, wherein the component is a sole element or a midsole element.

18. The method of claim 17, wherein the component is a sole element, and wherein the method further comprises attaching a portion of an upper to the sole element, when the sole element is secured in the system.

19. A clamping system for a component of an article of footwear or a sports article, the clamping system comprising:

a first plate having a first slot and a second slot;
a second plate having a first channel and a second channel;
a first pin received in the first slot of the first plate;
a second pin received in the second slot of the first plate;
a first slider received in the first channel of the second plate;
a second slider received in the second channel of the second plate;
a pivot about which the first plate and the second plate are rotatable relative to each other;
a first bracket coupled with the first pin and the first slider so as to be slidably movable by at least a first distance at least partly along the first slot of the first plate and at least partly along the first channel of the second plate when the first plate and the second plate are rotated relative to each other from a first angle to a second angle; and
at least a second bracket coupled with the second pin and the second slider so as to be slidably movable by at least a second distance at least partly along the second slot of the first plate and at least partly along the second channel of the second plate when the first plate and the second plate are rotated relative to each other from the first angle to the second angle, wherein rotation from the first angle to the second angle causes a magnitude of the second distance traveled by the second bracket along the second slot to be greater than a magnitude of the first distance traveled by the first bracket along the first slot.

* * * * *